(12) United States Patent
Sharma et al.

(10) Patent No.: US 12,737,505 B2
(45) Date of Patent: Sep. 15, 2026

(54) METHOD AND ELECTRONIC DEVICE FOR MANAGING PRIVACY OF SCREEN VIEW

(71) Applicant: Samsung Electronics Co., Ltd., Suwon-si (KR)

(72) Inventors: Anuj Kumar Sharma, Bengaluru (IN); Shobhit Mathur, Bengaluru (IN); Pritam Rajendra Nikam, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 18/346,481

(22) Filed: Jul. 3, 2023

(65) Prior Publication Data

US 2024/0005046 A1 Jan. 4, 2024

Related U.S. Application Data

(63) Continuation of application No. PCT/KR2023/004749, filed on Apr. 7, 2023.

(30) Foreign Application Priority Data

Jun. 30, 2022 (IN) ............................ 202241037547

(51) Int. Cl.
*G06F 21/62* (2013.01)
*G06F 21/84* (2013.01)

(52) U.S. Cl.
CPC .......... *G06F 21/84* (2013.01); *G06F 21/6245* (2013.01)

(58) Field of Classification Search
CPC ...... G06F 21/60; G06F 21/62; G06F 21/6218; G06F 21/6245; G06F 21/70; G06F 21/82; G06F 21/84
See application file for complete search history.

(56) References Cited

U.S. PATENT DOCUMENTS 9,417,784 B2 8/2016 Kwak et al.
11,170,295 B1 * 11/2021 Carmichael ........... A61B 5/1117
(Continued)

FOREIGN PATENT DOCUMENTS

CN 112905098 A 6/2021
CN 114580015 A 6/2022
(Continued)

OTHER PUBLICATIONS

International Search Report dated Jul. 19, 2023, issued in International Patent Application No. PCT/KR2023/004749.
(Continued)

*Primary Examiner* — D'Arcy Winston Straub
(74) *Attorney, Agent, or Firm* — Jefferson IP Law, LLP

(57) ABSTRACT

A method for managing privacy of a screen view on an electronic device is provided. The method includes displaying content on the screen view of an electronic device, where the content includes one or more private objects, determining the upcoming event(s) of a user of the electronic device and an associated user intent to share the displayed content during execution of the at least one upcoming event, determining one or more privacy parameters of the displayed content in relation to the upcoming event(s), and modifying the screen view of the electronic device based on one or more privacy parameters during execution of the upcoming event(s), where the modified screen view exclude some or more private objects which is not essential to execute the upcoming event(s).

12 Claims, 16 Drawing Sheets

(56) References Cited

U.S. PATENT DOCUMENTS

| | | | |
|---|---|---|---|
| 2014/0041042 A1 | 2/2014 | Wong et al. | |
| 2015/0278534 A1 | 10/2015 | Thiyagarajan et al. | |
| 2017/0255786 A1 | 9/2017 | Krishnamurthi | |
| 2019/0205887 A1* | 7/2019 | Kimmel | G06F 21/6245 |
| 2020/0184080 A1* | 6/2020 | Trim | G06F 21/84 |
| 2020/0210553 A1* | 7/2020 | Lin | G06N 3/08 |
| 2021/0048973 A1* | 2/2021 | Schwabacher | G06F 21/6245 |
| 2021/0195013 A1 | 6/2021 | Butcher et al. | |
| 2021/0294926 A1* | 9/2021 | Duffy | G06F 21/6245 |
| 2022/0147648 A1* | 5/2022 | Babcock | G06F 21/6245 |
| 2023/0012574 A1* | 1/2023 | Azam | G06F 21/6245 |
| 2024/0320377 A1 | 9/2024 | Liu et al. | |

FOREIGN PATENT DOCUMENTS

| | | |
|---|---|---|
| EP | 4053726 A1 | 9/2022 |
| JP | 2020-046953 A | 3/2020 |
| WO | 2021/145859 A1 | 7/2021 |
| WO | 2021-155242 A1 | 8/2021 |

OTHER PUBLICATIONS

Indian Office Action dated May 1, 2025, for Indian Appln. No. 202241037547.

Extended European Search Report dated May 15, 2025, for European Appln. No. 23831686.3-1218.

* cited by examiner

Required information for booking

14

Driving Licence

DL No. : XX07

Valid from 4/2010 to 4/2030

Name: Jack S

DOB: 07/07/1880

Address: JP road,xx-36xx-1

Signature:

Safe-view generator 163

Event intended UI extractor 163a

Layout modifier 163b

METHOD AND ELECTRONIC DEVICE FOR MANAGING PRIVACY OF SCREEN VIEW

CROSS-REFERENCE TO RELATED APPLICATION(S)

This application is a continuation, claiming priority under § 365(c), of an International application No. PCT/KR2023/004749, filed on Apr. 7, 2023, which is based on and claims the benefit of an Indian patent application number 202241037547, filed on Jun. 30, 2022, in the Indian Intellectual Property Office, the disclosure of which is incorporated by reference herein in its entirety.

BACKGROUND

1. Field

The disclosure relates to an electronic device. More particularly, the disclosure relates to a method and the electronic device for managing privacy of a screen view on an electronic device.

2. Description of Related Art

A mobile phone is classified as a personal electronic device. However, in everyday life, a user is required to share mobile phones or mobile screens with other users, which poses a security risk because other users can access personal information of the user, whether intentionally or unintentionally. Most of a time, all personal information isn't required to finish a task/event (e.g., booking a hotel room).

FIGS. 1A and 1B illustrate certain methods to keep personal information safe from being shared with other users while sharing an electronic device according to the related art.

Referring to FIG. 1A, consider a following scenario (1), where a user of an electronic device (10) wishes to book a hotel room (11). Further, a hotel staff member requested the user to show identification (ID) card of the user for verification purposes (12). In that case, the user of the electronic device (10) searches (13*a*) for a digital ID (e.g., a driver's license) stored in the electronic device (13) and shows the digital ID (14) to the hotel staff member to complete the verification and book the hotel room. In this scenario (1), the digital ID contains personal information, such as a user's driving license number (DL number), a driving license number's validity, a user's name, a user's date of birth (DOB), a user's address, and a user's signature. All personal information is not required to book a hotel room. The user's DL number and name are sufficient. However, the user unintentionally shares (14) additional personal information (e.g., the user's DOB, address, and signature) to the hotel staff member, posing a security risk.

Certain methods of the related art keep personal information safe from being shared with other users while sharing the electronic device (10) or screen of the electronic device (10). Blurring and/or masking personal information and modifying application content are two examples of methods of the related art.

Referring to FIG. 1B, consider a following scenario (2), where a second user requests assistance from a first user of an electronic device (10) in order to book a cab because the second user has left her phone at home (21). So, the first user will give his phone to the second user (22). But before sharing the electronic device (10) with the second user, the first user notices that a cab booking application (23, 24) contains some personal information (e.g., saved place, payment method). So, the first user uses the method of the related art (e.g., blurring method (25*a* and 25*b*)) (25) to prevent personal information from being shared with the second user while sharing the electronic device (10) or screen of the electronic device (10).

However, the methods of the related art have some limitations (for example, blurring and/or masking personal information). Regardless of the task's intent, the methods/electronic device (10) of the related art mask/blur all personal information by default. All blurring shapes (such as circles) aren't ideal for concealing all types of content (e.g., personal information). As a result, there is a high risk of a data breach. Furthermore, there are also a variety of tools and techniques for de-blurring images, such as Photo Enhancer AI. The users can take a screenshot/click a picture and then de-blur the content later, exposing their personal information. Furthermore, the methods of the related art use mask/blur on static content, and the personal information that may be required to complete an event is sometimes blurred as well. Furthermore, current methods do not take user privacy or event relevancy into account when sharing content in real-time. Furthermore, due to application permissions, methods of the related art will not be able to modify a user interface (UI) element of a running application.

Certain methods of the related art keep personal information safe from being shared with other users while sharing the electronic device (10) or screen of the electronic device (10) by modifying application content. However, a major drawback of this solution is that the user/solution may require application modification permissions, which not all applications will provide.

Thus, it is desired to address the above-mentioned disadvantages or other shortcomings or at least provide a useful alternative for managing the privacy of the screen view.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device for managing privacy of a screen view on the electronic device by intelligently modifying the screen view of the electronic device based on one or more privacy parameters (e.g., a region of interest (RoI), a sensitivity index, an event relevancy score, or the like) during execution of an upcoming event (e.g., ticket booking). The modified screen view excludes one or more private objects which is not essential to execute the at least one upcoming event/non-sensitive user interface (UI) component. The non-sensitive UI component is essential (minimum required UI component) to execute the upcoming event. As a result, the method executes the upcoming event with an essential non-sensitive UI component and protects a user's privacy without enhancing hardware components or frameworks associated with the electronic device.

Another aspect of the disclosure is to intelligently enable one or more screen views on the electronic device and/or connected electronic device(s) (e.g., a smart television (TV)) to display the modified screen view during the execution of the upcoming event. For example, in the case of "foldable electronic devices/flip electronic devices" or the like, and using one screen (main screen or first display) as "user-view/screen" and another screen (second display) as "safe-to-view/screen" for utilizing various available features of the electronic device to execute the upcoming event. As a result the electronic device takes user privacy or event relevancy into account when sharing the displayed content in real-time.

Additional aspects will be set forth in part in the description which follows and, in part, will be apparent from the description, or may be learned by practice of the presented embodiments.

In accordance with an aspect of the disclosure, a method for managing privacy of a screen view (e.g., user friendly interface) on an electronic device is provided. The method includes displaying, by the electronic device, a content on the screen view of the electronic device, wherein the content includes one or more private objects, determining, by the electronic device, an upcoming event(s) of a user of the electronic device and an associated user intent to share the displayed content during execution of the upcoming event(s), determining, by the electronic device, one or more privacy parameters of the displayed content in relation to the upcoming event(s), modifying, by the electronic device, the screen view of the electronic device based on one or more privacy parameters during execution of the upcoming event(s), wherein the modifying including modifying at least one of a number and location of one or more private objects included in the content based on one or more privacy parameters.

In an embodiment of the disclosure, where the screen view of the electronic device is displayed on a first screen of the electronic device.

In an embodiment of the disclosure, where the modified screen view of the electronic device is displayed on a second screen of the electronic device and/or a screen of a connected electronic device.

In an embodiment of the disclosure, where determining, by the electronic device, the upcoming event(s) of the electronic device and the associated user intent to share the displayed content during execution of the upcoming event(s) includes determining, by the electronic device, a plurality of event parameters of the displayed content, applying, by the electronic device, the plurality of event parameters to a pre-trained on-device machine learning (ML) model to determine the upcoming event(s) in a real-time, determining, by the electronic device, the upcoming event(s) of the electronic device, determining, by the electronic device, whether a safe-to-view is compatible for the upcoming event(s) based on the displayed content on the screen view of the electronic device, where the safe-to-view excludes one or more private objects which is not essential to execute the upcoming event(s), displaying, by the electronic device, a notification message on the screen view of the electronic device to share the displayed content in response to determining that the safe-to-view is compatible for the upcoming event(s), and receiving, by the electronic device, the user intent to share the displayed content when the notification message is displayed on the screen view of the electronic device.

In an embodiment of the disclosure, where the plurality of event parameters includes, but are not limited to, one or more screen context information, time-stamp information, location information, and information associated with currently running application of the electronic device.

In an embodiment of the disclosure, where the upcoming event includes, but are not limited to, a payment event, a booking event, a check-in event, a dynamic web-content sharing event, and a screen sharing event.

In an embodiment of the disclosure, where the user's intent to share the displayed content includes, but are not limited to, a text command received from a user of the electronic device, a voice input received from the user of the electronic device, a touch input received from the user of the electronic device, a gesture input received from the user of the electronic device, changing an orientation of the electronic device, selecting a region on the screen of the electronic device and pressing a hardware key of the electronic device.

In an embodiment of the disclosure, whereon or more privacy parameters includes a region of interest (RoI), a sensitivity index, and an event relevancy score.

In an embodiment of the disclosure, where the RoI is determined by extracting, by the electronic device, the RoI of the screen view of the electronic device through a segmentation process, where the RoI includes a user interface (UI) component(s) (e.g., sensitive-UI component, non-sensitive-UI component, or the like).

In an embodiment of the disclosure, where the sensitivity index is determined by determining, by the electronic device, the sensitivity index of each UI component using a pre-trained on-device deep learning classifier, wherein the pre-trained on-device deep learning classifier is trained using a diverse dataset, and the diverse dataset comprises the user intent, a preference of the user, a previous interaction of the user, and screen context information.

In an embodiment of the disclosure, where the event relevancy is determined by determining, by the electronic device, the event relevancy score of each UI component using the pre-trained on-device deep learning classifier, where the pre-trained on-device deep learning classifier is trained using a diverse dataset, and the diverse dataset includes an intent of the upcoming event(s), a preference of the user relates to the upcoming event(s), a previous interaction of the user with the upcoming event(s), and the screen context information.

In an embodiment of the disclosure, where modifying, by the electronic device, the screen view of the electronic device based on one or more privacy parameters during execution of the upcoming event(s) includes short listing, by the electronic device, the UI component(s) based on one or more privacy parameters, where the shortlisted UI component(s) is essential to execute the upcoming event(s), and intelligently modifying, by the electronic device, the screen view of the electronic device based on one or more a display property of the electronic device, an orientation of the electronic device, user-related information, and user feedback, where the modified screen view of the electronic device includes the shortlisted UI component(s).

In accordance with another aspect of the disclosure, an electronic device for managing the privacy of the screen view on the electronic device is provided. The electronic device includes a display; at least one processor; a memory storing one or more programs configured to be executed by the at least one processors, the one or more programs including instructions for: displaying, on the display, a content on the screen view of the electronic device, wherein the content comprises one or more private objects, determining at least one upcoming event of a user of the electronic device, determining one or more privacy parameters of the displayed content in relation to the at least one upcoming event, and modifying the screen view of the electronic device based on one or more privacy parameters during execution of the at least one upcoming event, wherein the at least one processor modifies at least one of a number and location of one or more private objects included in the content based on one or more privacy parameters.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B illustrates a block diagram of a user interface (UI)-event detector of the electronic device for managing the privacy of the screen view according to an embodiment of the disclosure;

FIG. 2C illustrates a block diagram of an intelligence score generator of the electronic device for managing the privacy of the screen view according to an embodiment of the disclosure;

FIG. 2D illustrates a block diagram of a safe-view generator of the electronic device for managing the privacy of the screen view according to an embodiment of the disclosure;

The same reference numerals are used to represent the same elements throughout the drawings.

DETAILED DESCRIPTION

Figure 1A:
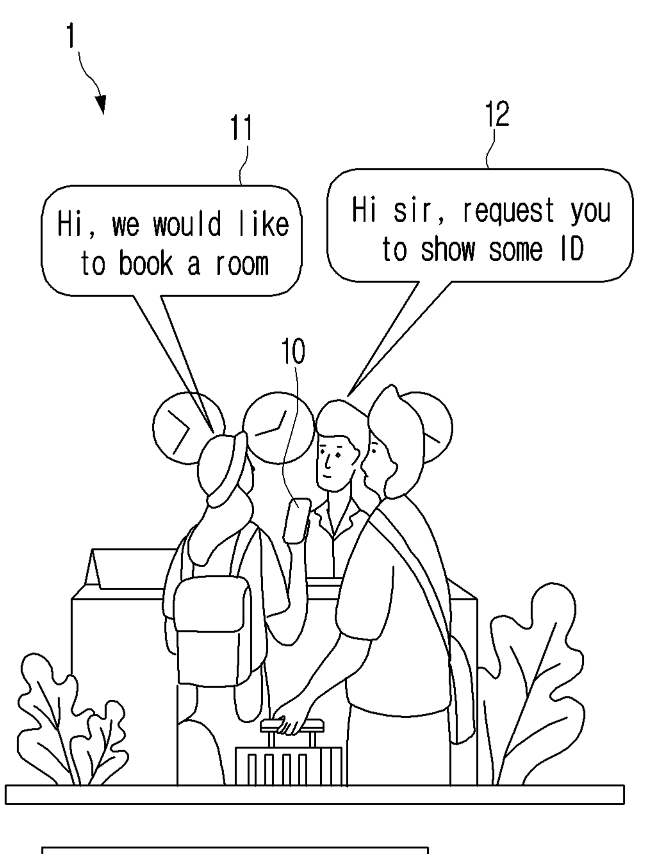
FIGS. 1A and 1B illustrate certain methods to keep personal information safe from being shared with other users while sharing an electronic device according to the related art.
Figure 1A:
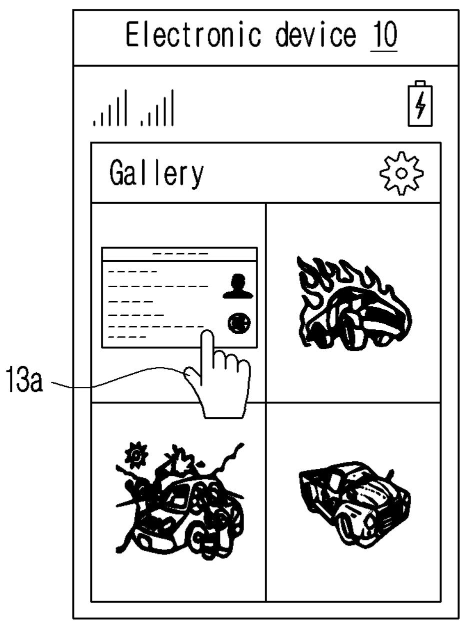
Figure 1B:
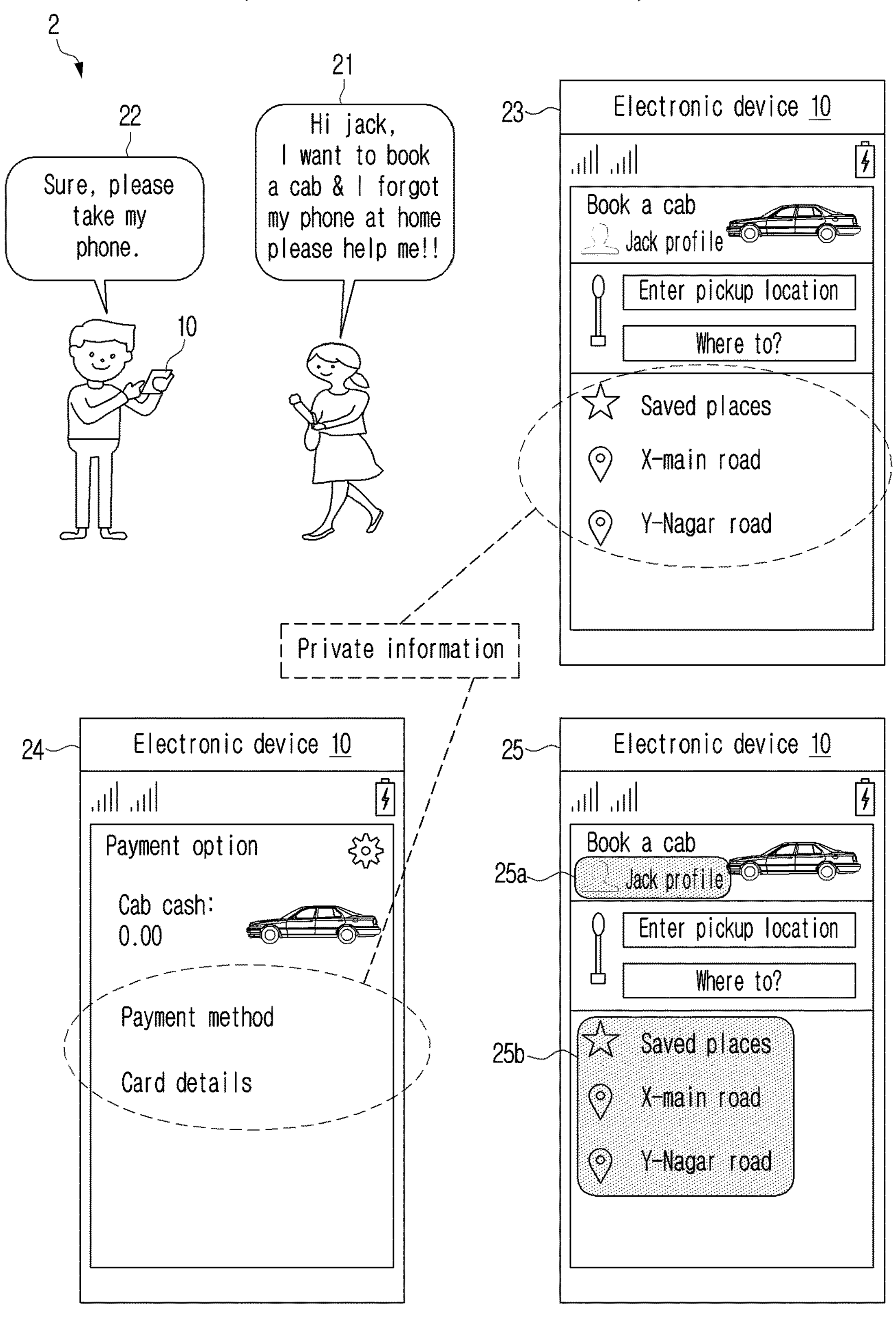

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Similarly, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Accordingly, embodiments herein disclose a method for managing privacy of a screen view on an electronic device. The method includes displaying, by the electronic device, content on the screen view of the electronic device, wherein the content includes one or more private. Furthermore, the method includes determining, by the electronic device, an upcoming event(s) of a user of the electronic device and an associated user intent to share the displayed content during execution of the upcoming event(s). Furthermore, the method includes determining, by the electronic device, one or more privacy parameters of the displayed content in relation to the upcoming event(s). Furthermore, the method includes modifying, by the electronic device, the screen view of the electronic device based on one or more privacy parameters during execution of the upcoming event(s), where the modified screen view excludes one or more private objects which is not essential to execute the upcoming event(s).

Accordingly, the embodiments herein provide the electronic device for managing the privacy of the screen view on the electronic device. The electronic device includes a privacy controller coupled with a processor and a memory. The privacy controller displays the content on the screen view of the electronic device, where the content includes the one or more private objects. Furthermore, the privacy controller determines the upcoming event(s) of the user of the electronic device and the associated user intent to share the displayed content during execution of the upcoming event(s). Furthermore, the privacy controller determines one or more privacy parameters of the displayed content in relation to the upcoming event(s). Furthermore, the privacy controller modifies the screen view of the electronic device based on one or more privacy parameters during execution of the upcoming event(s), where the modified screen view excludes one or more private objects which is not essential to execute the upcoming event(s).

Unlike methods and systems of the related art, the proposed method allows the electronic device to manage the privacy of the screen view on the electronic device by intelligently modifying the screen view of the electronic device based on one or more privacy parameters (e.g., a region of interest (RoI), a sensitivity index, an event relevancy score, or the like) during execution of the upcoming event(s) (e.g., ticket booking). The modified screen view excludes one or more private objects which is not essential to execute the upcoming event(s)/non-sensitive UI component(s). The non-sensitive UI component(s) is essential (minimum required UI component(s)) to execute the upcoming event(s). As a result, the method executes the upcoming event(s) with essential non-sensitive UI component(s) and protects the user's privacy without enhancing hardware components or framework associated with the electronic device.

Another aspect of the embodiment herein is to intelligently enable one or more screen views on the electronic device and/or connected electronic device(s) (e.g., a smart television (TV), a smart watch, or the like) to display the modified screen view during the execution of the upcoming event(s). For example, in the case of "foldable electronic devices/flip electronic devices" or the like, and using one screen (main screen or first display) as "user-view/screen" and another screen (second display) as "safe-to-view/screen" for utilizing various available features of the electronic device to execute the upcoming event(s). As a result, the electronic device takes user privacy or event relevancy into account when sharing displayed content in real-time.

Referring now to the drawings, and more particularly to FIGS. 2A, 2B, 2C, 2D, and 3 to 12, where similar reference characters denote corresponding features consistently throughout the figures, there are shown preferred embodiments.

Figure 2A:
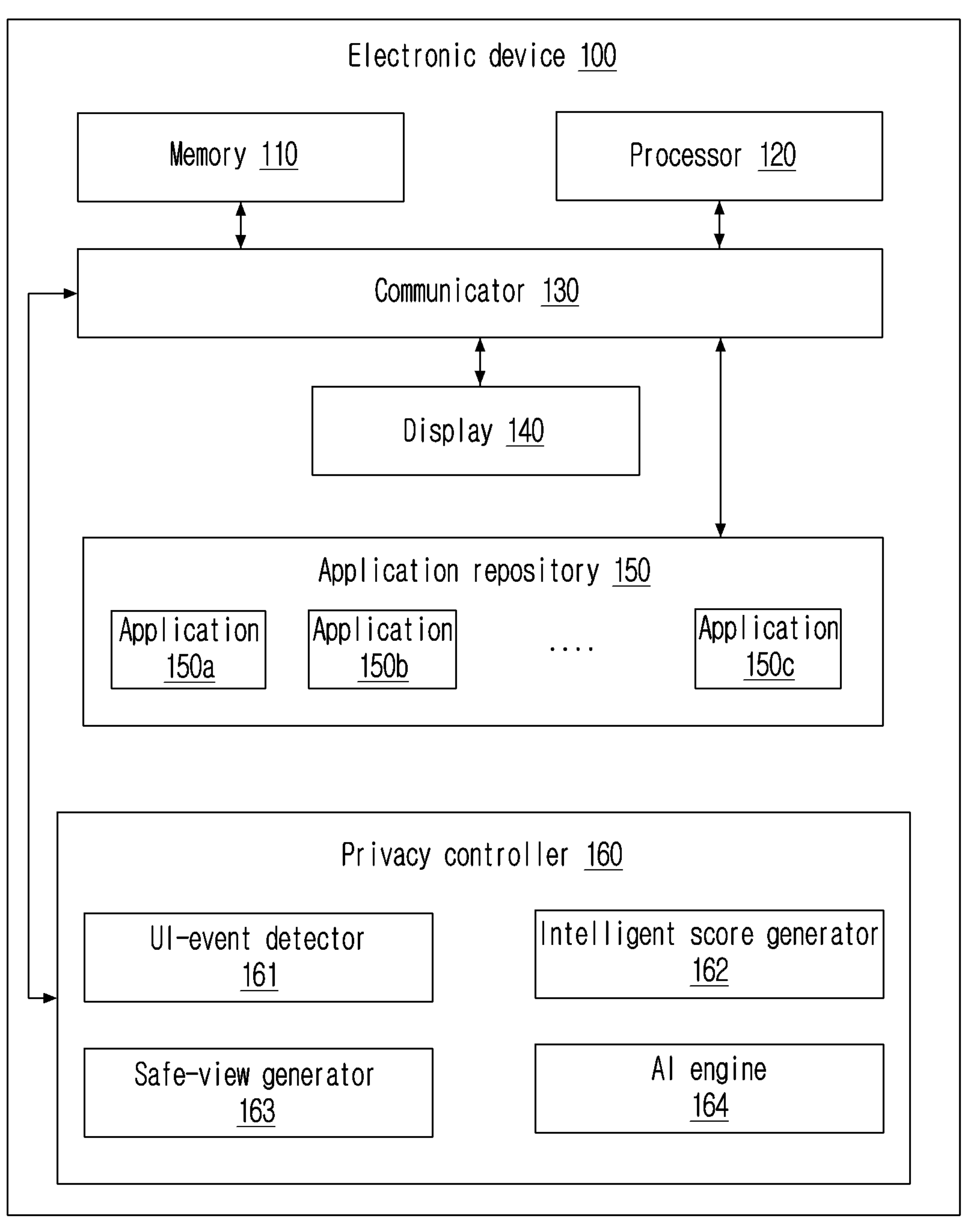
FIG. 2A illustrates a block diagram of an electronic device for managing privacy of a screen view according to an embodiment of the disclosure.

FIG. 2A illustrates a block diagram of an electronic device for managing privacy of a screen view according to an embodiment of the disclosure.

Referring to FIG. 2A, the electronic device (100) can be, for example, but is not limited, to a smartphone, a laptop, a smart television (TV), or the like.

In an embodiment of the disclosure, the electronic device (100) includes a memory (110), a processor (120), a communicator (130), a display (140), an application repository (150), and a privacy controller (160).

In an embodiment of the disclosure, the memory (110) stores one or more privacy parameters of a displayed content, an upcoming event(s) of a user of the electronic device (100), and an associated user intent, and a plurality of event parameters. The memory (110) stores one or more programs including instructions to be executed by the processor (120). The one or more programs including instructions for displaying, on the display, a content on the screen view of the electronic device, wherein the content comprises one or more private objects determining at least one upcoming event of a user of the electronic device, determining one or more privacy parameters of the displayed content in relation to the at least one upcoming event, and modifying the screen view of the electronic device based on one or more privacy parameters during execution of the at least one upcoming event, wherein the at least one processor modifies at least one of a number and location of one or more private objects included in the content based on one or more privacy parameters.

The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in random access memory (RAM) or cache). The memory (110) can be an internal storage unit or it can be an external storage unit of the electronic device (100), a cloud storage, or any other type of external storage.

The processor (120) communicates with the memory (110), the communicator (130), the display (140), the application repository (150), and the privacy controller (160). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit, such as a graphics processing unit (GPU), a visual processing unit (VPU), and/or an Artificial intelligence (AI) dedicated processor, such as a neural processing unit (NPU).

The communicator (130) is configured for communicating internally between internal hardware components and with external devices (e.g., connected electronic devices, or the like) via one or more networks (e.g., radio technology). The communicator (130) includes an electronic circuit specific to a standard that enables wired or wireless communication.

The display (140) (e.g., a first screen (140*a*) of the electronic device (100) (not shown in FIG. 2A), a second screen (140*b*) of the electronic device (100), or the like) receives user inputs and is made of a liquid crystal display (LCD), a light-emitting diode (LED), an organic light-emitting diode (OLED), or another type of display. The user inputs may include but are not limited to, touch, swipe, drag, gesture, voice command, and so on. The display (140) has shown content on the screen view of the electronic device (100), where the content includes one or more private objects (e.g., user's bank details).

The application repository (150) is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards and the like. The application repository (150*a*) is configured to store functional information and corresponding screen identity for each application of the electronic device (100). The application repository (150) includes a plurality of 15 application (150*a*) to application (150*n*). Examples for the application repository (150*a*) are, but not limited, to a media application, a web application, a video player application, a camera application, a game application, a business application, an education application, a lifestyle application, an entertainment application, a utility application, a travel application, or the like.

The privacy controller (160) is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards, or the like.

More particularly, the privacy controller 160 may change at least one of the number or location of one or more objects included in content based on one or more privacy parameters. In other words, the privacy controller 160 may remove some of one or more objects included in the content based on the privacy parameter, and change the location of some of the one or more objects. Alternatively, the privacy controller 160 may change the size or shape of one or more objects included in the content based on the privacy parameter.

In an embodiment of the disclosure, the privacy controller (160) includes a UI-event detector (161), an intelligent score generator (162), a safe-view generator (163), and an artificial intelligence (AI) engine (164).

The UI-event detector (161) determines the upcoming event(s) of a user of the electronic device (100) and an associated user intent to share the displayed content during execution of the upcoming event(s). The upcoming event (s) includes, but are not limited to, a payment event, a booking event, a check-in event, a dynamic web-content sharing event, and a screen sharing event. The user intent to share the displayed content is determined based on, for example, a text command received from the user of the electronic device (100), a voice input received from the user of the electronic device (100), a touch input received from the user of the electronic device (100), a gesture input received from the user of the electronic device (100), changing an orientation of the electronic device (100), selecting a region on the screen (i.e., a display (140)) of the electronic device (100), pressing a hardware key of the electronic device (100), or the like. The UI-event detector (161) extracts a region of interest (RoI) of the screen view of the electronic device (100) through a segmentation method, where the RoI includes a user interface (UI) component(s).

Furthermore, the UI-event detector (161) determines the plurality of event parameters of the displayed content. The plurality of event parameters includes, but are not limited to, screen context information, time-stamp information, location information, and information associated with the currently running application of the electronic device (100). The UI-event detector (161) applies the plurality of event parameters to a pre-trained on-device machine learning (ML) model to determine the upcoming event(s) in real-time. The UI-event detector (161) determines the upcoming event(s) of the electronic device (100). The UI-event detector (161) determines whether a safe-to-view is compatible with the upcoming event(s) based on the displayed content on the screen view of the electronic device (100), where the safe-to-view excludes one or more private objects which is not essential to execute the upcoming event(s). The display (140) displays a notification message (e.g., pop-up message, voice message, banner, or the like) on the screen view of the electronic device (100) to share the displayed content in response to determining that the safe-to-view is compatible for the upcoming event(s). The UI-event detector (161) then receives the user's intent to share the displayed content when the notification message is displayed on the screen view of the electronic device (100).

The intelligent score generator (162) determines one or more privacy parameters of the displayed content in relation to the upcoming event(s). One or more privacy parameters includes the RoI, a sensitivity index, and an event relevancy score. The intelligent score generator (162) determines the sensitivity index of each UI component using a pre-trained on-device deep learning classifier. The pre-trained on-device deep learning classifier is trained using a diverse dataset, and the diverse dataset includes the user intent, a preference of the user, a previous interaction of the user, and screen context information. The intelligent score generator (162) determines the event relevancy score of each UI component using the pre-trained on-device deep learning classifier. The pre-trained on-device deep learning classifier was trained using a diverse dataset. The diverse dataset includes an intent of the upcoming event(s), a preference of the user relates to the upcoming event(s), a previous interaction of the user with the upcoming event(s), and the screen context information.

The safe-view generator (163) modifies the screen view of the electronic device (100) based on one or more privacy parameters during execution of the upcoming event(s). The modified screen view excludes one or more private objects which is not essential to execute the upcoming event(s). The screen view of the electronic device (100) is displayed on a first screen (140*a*)(not shown in FIG. 2A) of the electronic device (100). The modified screen view of the electronic device (100) is displayed on a second screen (140*b*)(not shown in FIG. 2A) of the electronic device (100) and/or a screen of a connected electronic device (not shown in FIG. 2A). The safe-view generator (163) shortlists the UI component(s) based on one or more privacy parameters. The shortlisted UI component(s) is essential to execute the upcoming event(s). The safe-view generator (163) then intelligently modifies the screen view of the electronic device (100) based on, one or more, display properties of the electronic device (100), an orientation of the electronic device (100), user-related information, and user feedback. The modified screen view of the electronic device (100) includes the shortlisted UI component(s).

At least one of the plurality of modules/components of the FIG. 2A may be implemented through the AI engine (164). A function associated with the AI engine (164) may be performed through the corresponding memory (110) and the processor (120). One or a plurality of processors controls the processing of the input data in accordance with a predefined operating rule or the AI engine (164) stored in the non-volatile memory and the volatile memory. The predefined operating rule or the AI engine (164) is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

The AI engine (164) may consist of a plurality of neural network layers. Each layer has a plurality of weight values and performs a layer operation through the calculation of a previous layer and an operation of a plurality of weights. Examples of neural networks include, but are not limited to, convolution neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Meanwhile, according to an embodiment of the disclosure, the privacy controller 160 may be implemented separately from the processor 120, but this is only an example. The privacy controller 160 may be integrated with the processor 120 to be implemented as at least one processor.

Although the FIG. 2A shows various hardware components of the electronic device (100) but it is to be understood that other embodiments are not limited thereon. In other embodiments of the disclosure, the electronic device (100) may include less or more number of components. Further, the labels or names of the components are used only for illustrative purpose and does not limit the scope of the disclosure. One or more components can be combined together to perform the same or substantially similar function to manage the privacy of the screen view.

Figure 2B:
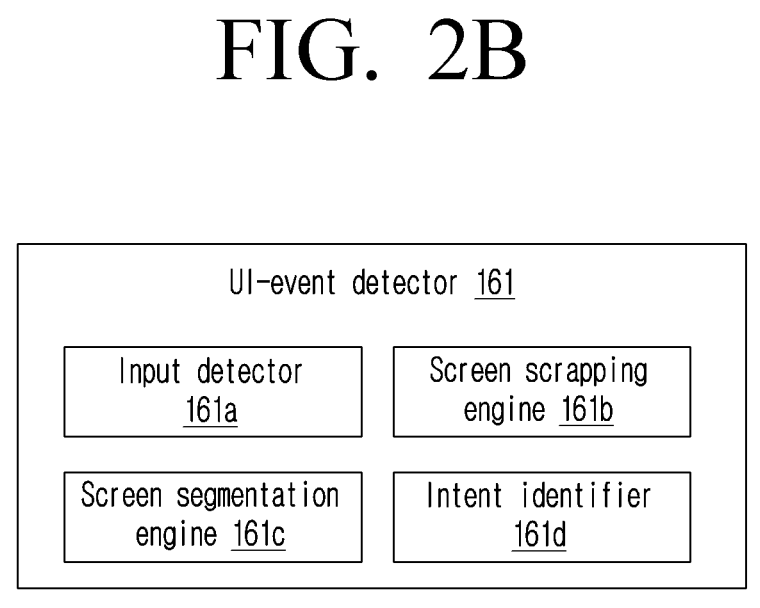

FIG. 2B illustrates a block diagram of a UI-event detector of an electronic device for managing a privacy of a screen view according to an embodiment of the disclosure.

Referring to FIG. 2B, the UI-event detector (161) includes an input detector (161*a*), a screen scrapping engine (161*b*), a screen segmentation engine (161*c*), and an intent identifier (161*d*).

The input detector (161*a*) receives various types of input from the user of the electronic device (100). For example, the text command received from the user of the electronic device (100), the voice input received from the user of the electronic device (100), the touch input received from the user of the electronic device (100), the gesture input received from the user of the electronic device (100), changing the orientation of the electronic device (100), selecting the region on the screen of the electronic device (100) and pressing the hardware key of the electronic device (100).

The screen scraping engine (161*b*) scrapes the displayed content to extract the RoI and serializes the extracted RoI to the screen segmentation engine (161*c*) based on application content localization. One or more UI components (e.g., email id link) are included in the extracted RoI. The RoI is determined using mechanisms, such as a pre-trained regression model, a classifier, and non-max suppression mechanisms. The pre-trained regression model predicts bounding box coordinates (x, y, w, h), where x and y denote offset of cell location and w and h denote width and height, respectively. The classifier assigns these boxes class probabilities, where the probabilities (confidence score) indicate a likelihood that the boxes contain an object. The confidence score is determined by the below equation, confidence score=Pr (containing object)*IoU (pred, truth) (1)

Where Pr indicates probability and IoU indicates intersection over union, which is an evaluation metric used to measure the accuracy of an object detector on a particular dataset. The non-max suppression selects the most appropriate bounded box by first selecting the bounded box with a high confidence score and then removing all the other boxes with high overlap.

The screen segmentation engine (161*c*) generates a feature map for all bounding boxes (i.e., most appropriate bounded box) by transforming region (most appropriate bounded box) into feature vectors using a pre-trained deep learning model (e.g., pre-trained on-device deep learning classifier). The screen segmentation engine (161*c*) divides the region into all candidate segments, such as s1, s2, s3 . . . sn. The screen segmentation engine (161*c*) predicts an object confidence score for each segment. The object confidence score indicates the likelihood that the region contains the object. If the object confidence score exceeds a certain threshold, the segment has a foreground object (e.g., an email id link, a mobile number, or the like), otherwise, the segment has a background object. The object is then labeled by the screen segmentation engine (161*c*), indicating which class it belongs to.

The intent identifier (161*d*) determines the intent of the user based on the plurality of event parameters. The plurality of event parameters includes the screen context information, the time-stamp information, the location information, and the information associated with the currently running application of the electronic device (100). The intent identifier (161*d*) utilizes the pre-trained on-device deep learning classifier to predict the event intent based on the input obtained post segmentation.

Figure 2C:
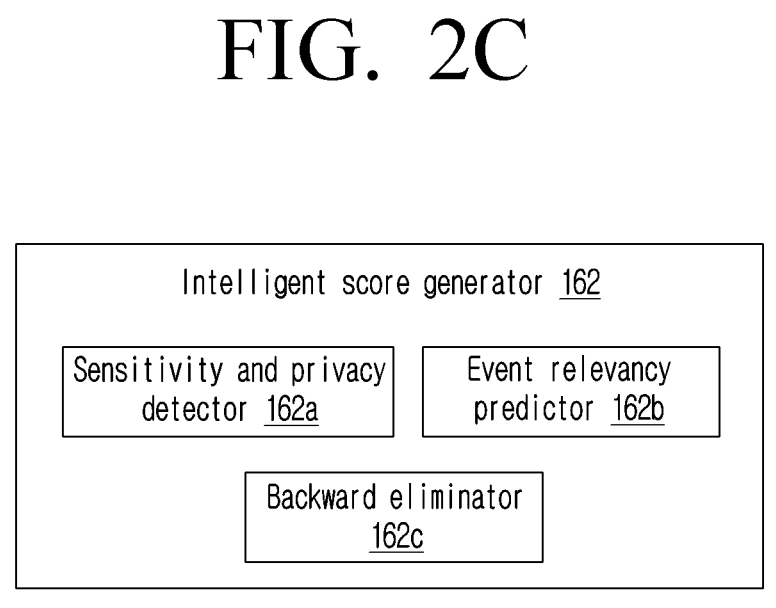

FIG. 2C illustrates a block diagram of an intelligence score generator of an electronic device for managing a privacy of a screen view according to an embodiment of the disclosure.

Referring to FIG. 2C, the intelligence score generator (162) includes a sensitivity and privacy detector (162*a*), an event relevancy predictor (162*b*), and a backward eliminator (162*c*).

The sensitivity and privacy detector (162*a*) use a set of rules/heuristics in conjunction with the pre-trained on-device deep learning classifier pre-trained on-device deep learning classifier trained on a diverse dataset with a plurality of parameters representing a user profile and the displayed UI component(s) derived attributes, such as user intent, user preferences, past interaction, display component context, and so on. The sensitivity and privacy detector (162*a*) were trained on massive amounts of labeled data, with each training record representing a set of labeled UI widgets and their sensitivity quotient. As a result, when the proposed method is triggered by the input detector (161*a*), the sensitivity and privacy detector (162*a*) extracts values from all pre-trained classifier parameters and determines whether the displayed UI component(s) is sensitive or non-sensitive.

The event relevancy predictor (162*b*) determines a degree of utilization/convenience of each UI component(s) with respect to the event using a hybrid framework comprised of a heuristics policy set and intelligent predictive model to determine a "degree of relevance" of each UI component(s), referred to as the "event relevancy score."

The backward eliminator (162*c*) receives a labeled set of UI component(s), as well as the sensitivity index and the event relevancy score, to obtain the shortlisted UI component(s). The shortlisted UI component(s) are event-tailored and privacy-preserving UI component(s) that are optimally necessary to successfully execute the event of user interest. The backward eliminator (162*c*) reduces visual complexity while facilitating the provision of actions with no privacy leakage in a user-friendly and convenient manner. The backward eliminator (162*c*) mitigates misclassification by using a feedback system.

Figure 2D:
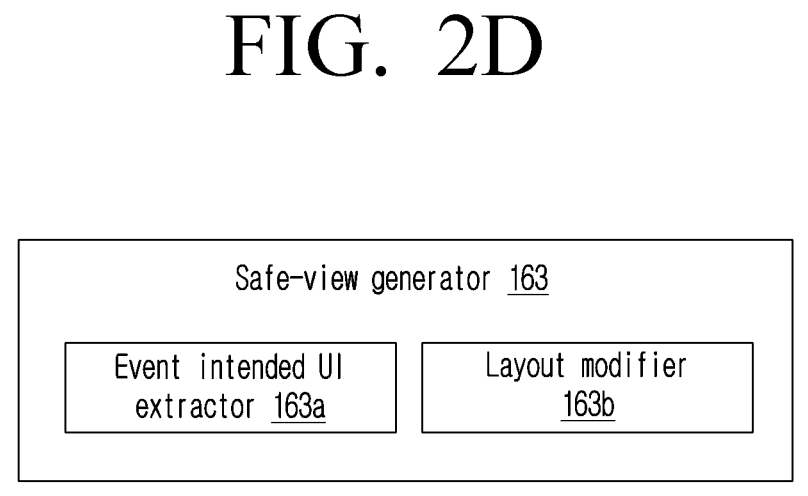

FIG. 2D illustrates a block diagram of a safe-view generator of an electronic device for managing a privacy of a screen view according to an embodiment of the disclosure.

Referring to FIG. 2D, the safe-view generator (163) includes an event intended UI extractor (163*a*) and a layout modifier (163*b*).

The event intended UI extractor (163*a*) optimizes the displayed UI component(s) by selectively retaining only those UI component(s) that are required to execute the event of the user's interest without leaking any private information. The set of UI component(s) (e.g., shortlisted UI component(s), the sensitivity index, and the event relevancy score are fed into the event intended UI extractor (163*a*). The event intended UI extractor (163*a*) then uses contextual semantic search (CSS) to determine the nature, intent, and fulfilment status of the upcoming event, using all possible subsets of UI component(s) guided by privacy-preserving principles. The event intended UI extractor (163*a*) then determines the optimal set of privacy-proof UI components for the event (e.g., shortlisted UI component(s)) and sends the optimal set of privacy-proof UI components to the layout modifier (163*b*).

The event intended UI extractor (163*a*) enables the user to experience reduced visual complexity or event-irrelevant clutter elimination while maintaining the user's privacy. For example, in a unified payments interface (UPI) transaction scenario, the event intended UI extractor (163*a*) extracts all UI components and discovers that only a quick response (QR) code is required to complete the UPI transaction.

The layout modifier (163*b*) intelligently modifies the screen view of the electronic device (100) based on one or more following factors: the display property of the electronic device (100), the orientation of the electronic device (100) (e.g., how the user folds or flips the multi-display electronic device while sharing contents), user-related information (e.g., whether the user is left-handed or right-handed, how the user holds the electronic device (100) while sharing contents), and the user feedback (e.g., manually modify the screen view). The layout modifier (163*b*) learns information (e.g., user-related information, display property, or the like) over a period of time by using the AI engine (164). The modified screen view of the electronic device (100) includes the shortlisted UI component(s), which is essential to execute the upcoming event(s).

Figure 3:
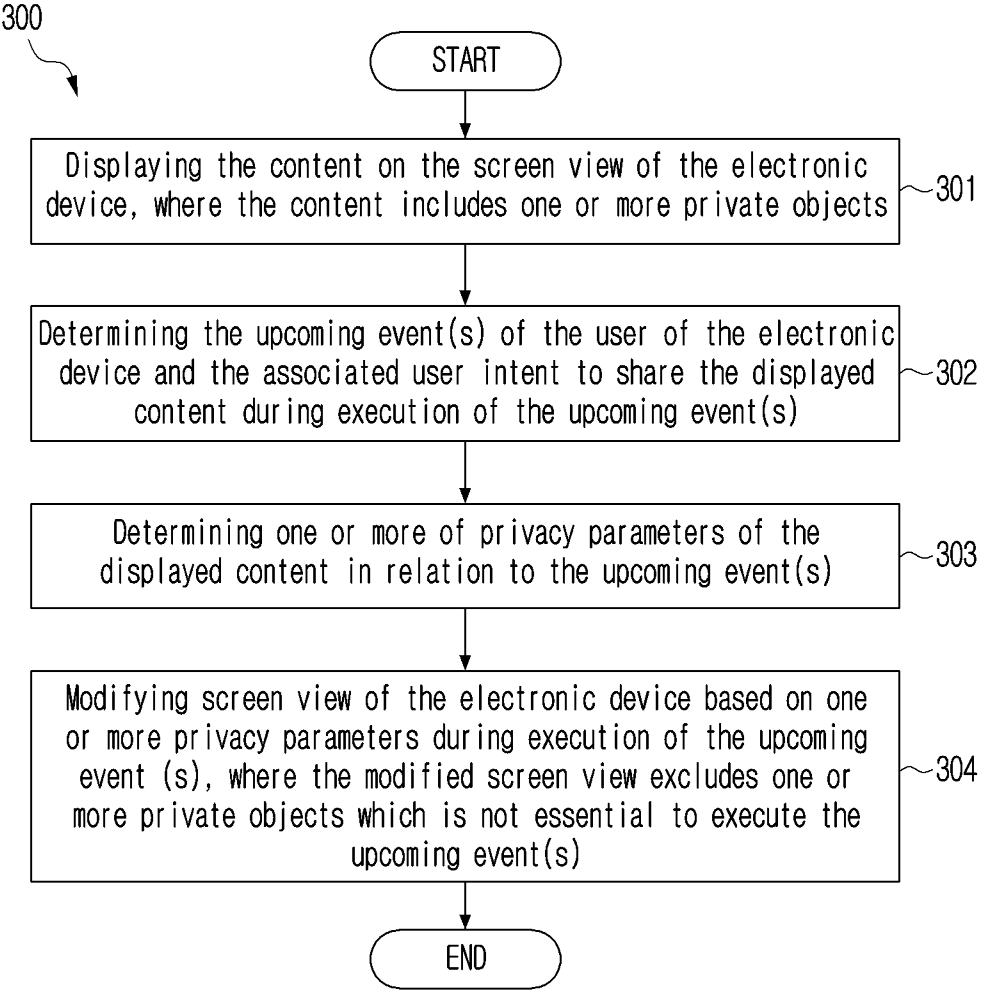
FIG. 3 is a flow diagram illustrating a method for managing the privacy of the screen view according to an embodiment of the disclosure.

FIG. 3 is a flow diagram (300) illustrating a method for managing a privacy of a screen view according to an embodiment of the disclosure.

Referring to FIG. 3, operations 301-304 performs by the electronic device (100).

At operation 301, the method includes displaying the content on the screen view of the electronic device (100), where the content includes the one or more private objects. At operation 302, the method includes determining the upcoming event(s) of the user of the electronic device (100) and the associated user intent to share the displayed content during execution of the upcoming event(s). At operation 303, the method includes determining one or more privacy parameters of the displayed content in relation to the upcoming event(s). At operation 304, the method includes modifying the screen view of the electronic device (100) based on one or more privacy parameters during execution of the upcoming event(s), where the modified screen view excludes one or more private objects which is not essential to execute the upcoming event(s).

Figure 4:
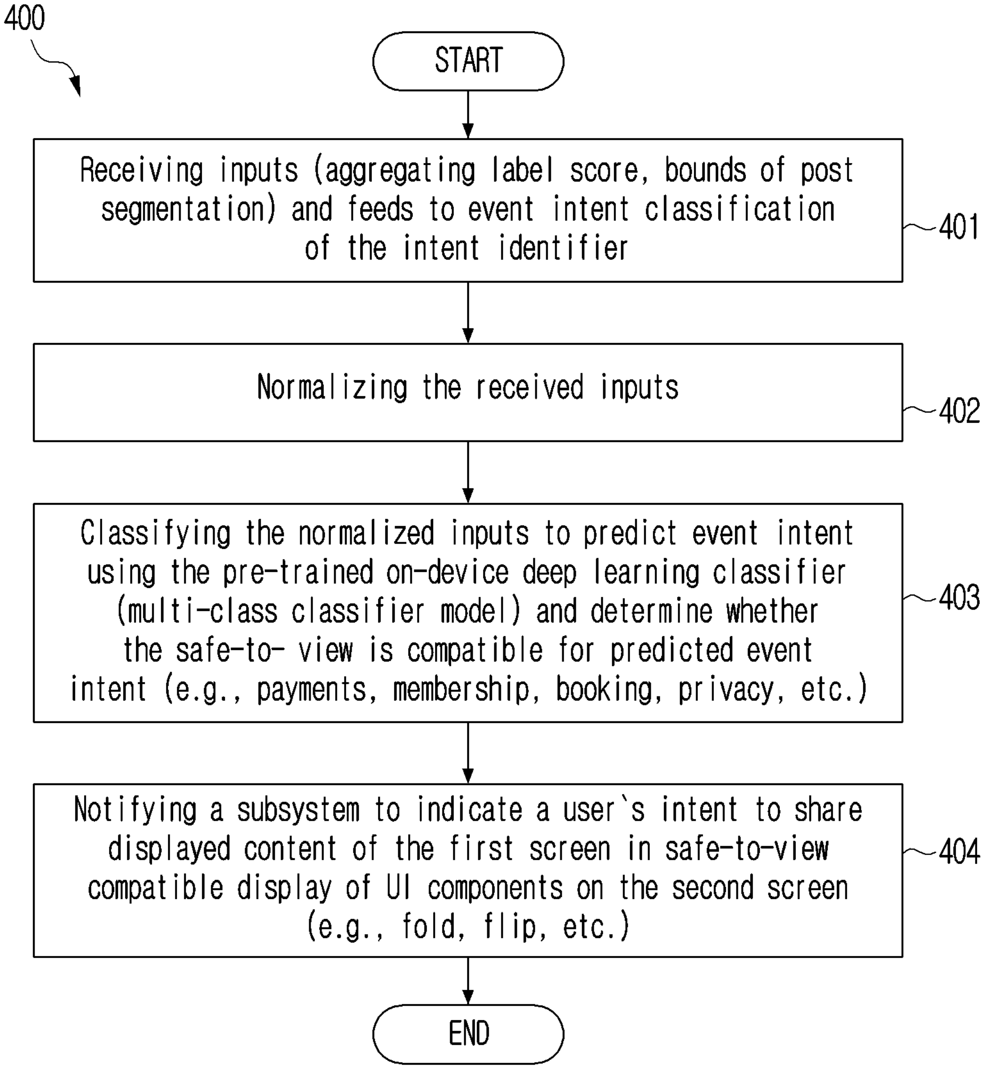
FIG. 4 is a flow diagram illustrating a method for determining an upcoming event(s) of the electronic device and an associated user intent to share a displayed content according to an embodiment of the disclosure.

FIG. 4 is a flow diagram (400) illustrating a method for determining upcoming event(s) of an electronic device and an associated user intent to share a displayed content according to an embodiment of the disclosure.

Referring to FIG. 4, operations 401-404 performs by the electronic device (100).

At operation 401, the method includes receiving inputs (aggregating label score, bounds of post segmentation) and feeds to event intent classification of the intent identifier (161*d*). At operation 402, the method includes normalizing the received inputs. At operation 403, the method includes classifying the normalized inputs to predict event intent using the pre-trained on-device deep learning classifier (multi-class classifier model) and determining whether the safe-to-view is compatible with predicted event intent (e.g., payments, membership, booking, privacy, or the like). At operation 404, the method includes notifying a subsystem to indicate the user's intent to share displayed content of the first screen (140*a*) in safe-to-view compatible display of UI components on the second screen (140*b*) (e.g., fold, flip,)

Figure 5:
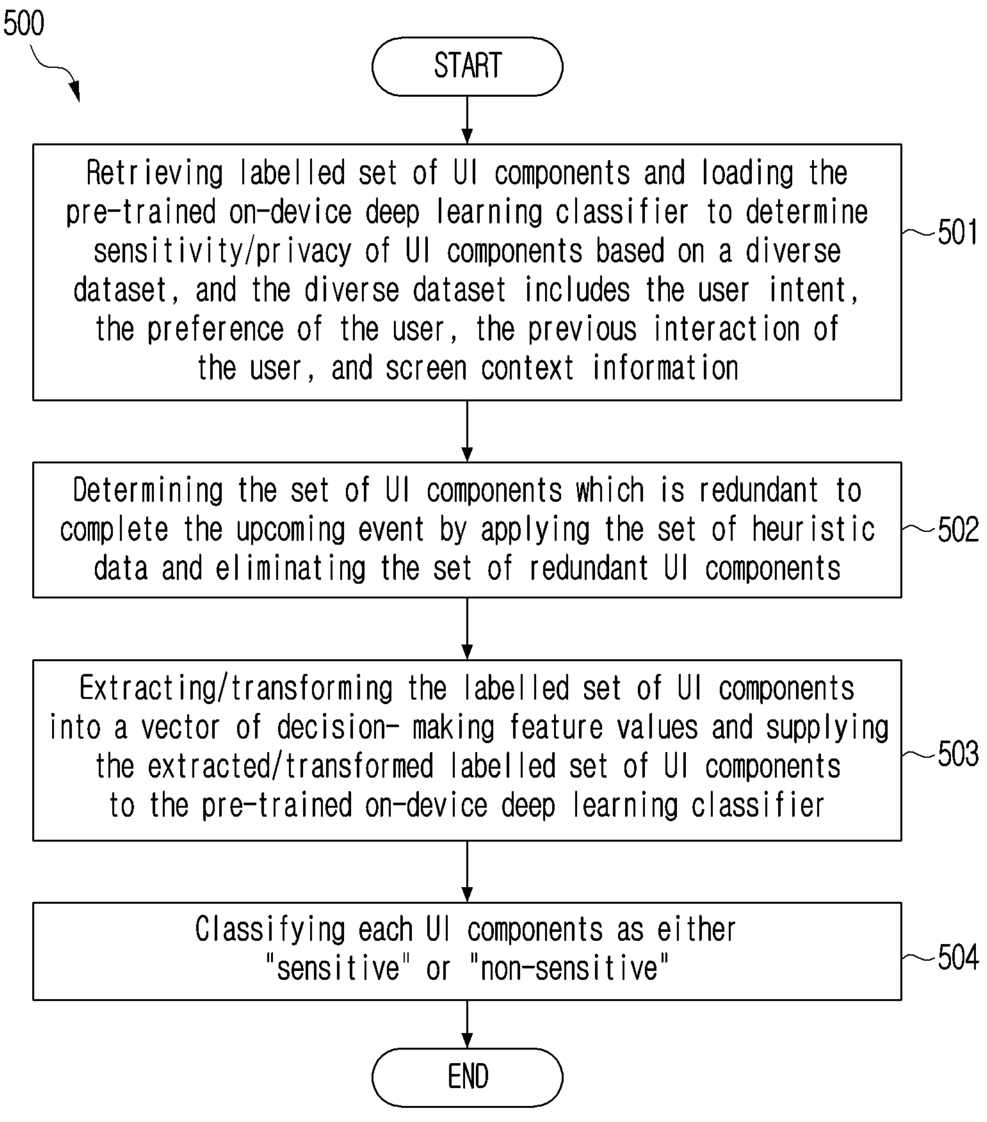
FIG. 5 is a flow diagram illustrating a method for determining a sensitivity index of each UI component using a pre-trained on-device deep learning classifier according to an embodiment of the disclosure.

FIG. 5 is a flow diagram (500) illustrating a method for determining a sensitivity index of each UI component using a pre-trained on-device deep learning classifier according to an embodiment of the disclosure.

Referring to FIG. 5, operations 501-504 performs by the electronic device (100).

At operation 501, the method includes retrieving the labelled set of UI component(s) and loading the pre-trained on-device deep learning classifier to determine sensitivity/privacy of UI component(s) based on the diverse dataset, and the diverse dataset includes the user intent, the preference of the user, the previous interaction of the user, and screen context information. At operation 502, the method includes determining the set of UI component(s) which is redundant to complete the upcoming event(s) by applying the set of heuristic data and eliminating the set of redundant UI components. At operation 503, the method includes extracting/transforming the labelled set of UI component(s) into a vector of decision-making feature values and supplying the extracted/transformed labeled set of UI component(s) to the pre-trained on-device deep learning classifier. At operation 504, the method includes classifying each UI component as either "sensitive" or "non-sensitive".

Figure 6:
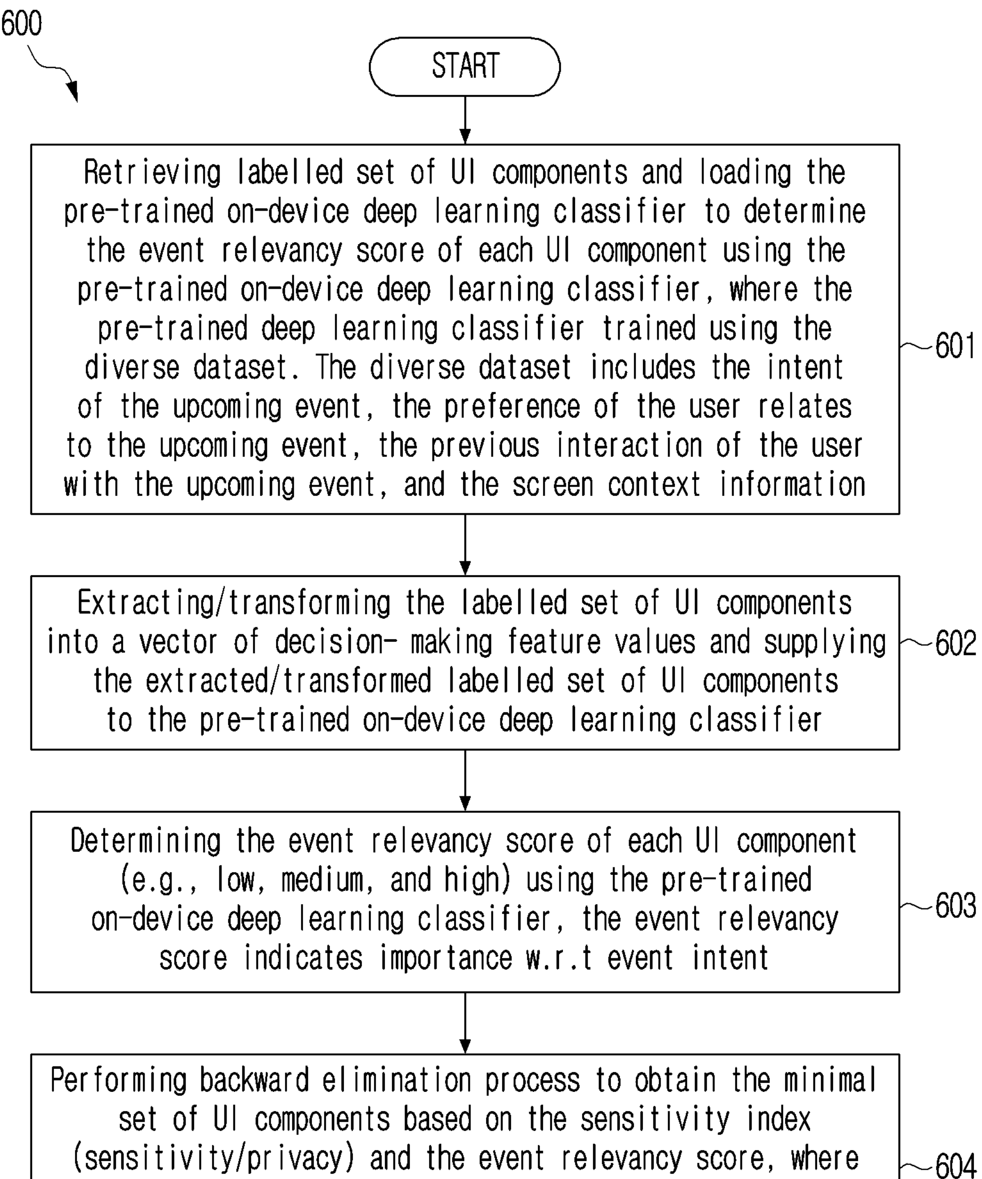
FIG. 6 is a flow diagram illustrating a method for determining an event relevancy score of each UI component using the pre-trained on-device deep learning classifier to obtain a minimal set of UI components to execute the upcoming event(s) according to an embodiment of the disclosure.

FIG. 6 is a flow diagram (600) illustrating a method for determining an event relevancy score of each UI component using a pre-trained on-device deep learning classifier to obtain a minimal set of UI components to execute upcoming event(s) according to an embodiment of the disclosure.

Referring to FIG. 6, operations 601-604 performs by the electronic device (100).

At operation 601, the method includes retrieving the labeled set of UI component(s) and loading the pre-trained on-device deep learning classifier to determine the event relevancy score of each UI component using the pre-trained on-device deep learning classifier, where the pre-trained on-device deep learning classifier trained using the diverse dataset. The diverse dataset includes the intent of the upcoming event(s), the preference of the user relates to the upcoming event(s), the previous interaction of the user with the upcoming event(s), and the screen context information. At operation 602, the method includes extracting/transforming the labelled set of UI components into a vector of decision-making feature values and supplying the extracted/transformed labelled set of UI components to the pre-trained on-device deep learning classifier. At operation 603, the method includes determining the event relevancy score of each UI component (e.g., low, medium, and high) using the pre-trained on-device deep learning classifier, the event relevancy score indicates the importance w.r.t event intent. At operation 604, the method includes performing a backward elimination process to obtain the minimal set of UI components based on the sensitivity index (sensitivity/privacy) and the event relevancy score, where the minimal set of UI components is essential to execute the upcoming event(s).

Figure 7:
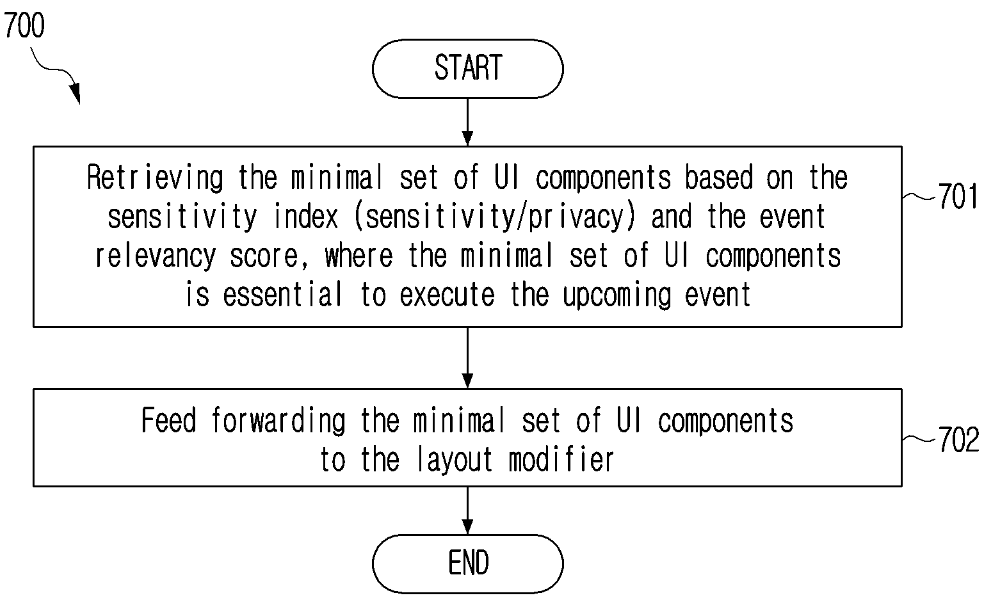
FIG. 7 is a flow diagram illustrating a method for determining the minimal set of UI components to execute the upcoming event(s) according to an embodiment of the disclosure.

FIG. 7 is a flow diagram (700) illustrating a method for determining a minimal set of UI components to execute upcoming event(s) according to an embodiment of the disclosure.

Referring to FIG. 7, operations 701-702 performs by the electronic device (100).

At operation 701, the method includes retrieving the minimal set of UI components based on the sensitivity index (sensitivity/privacy) and the event relevancy score, where the minimal set of UI components is essential to execute the upcoming event(s). At operation 702, the method includes feed forwarding the minimal set of UI components to the layout modifier (163*b*).

Figure 8:
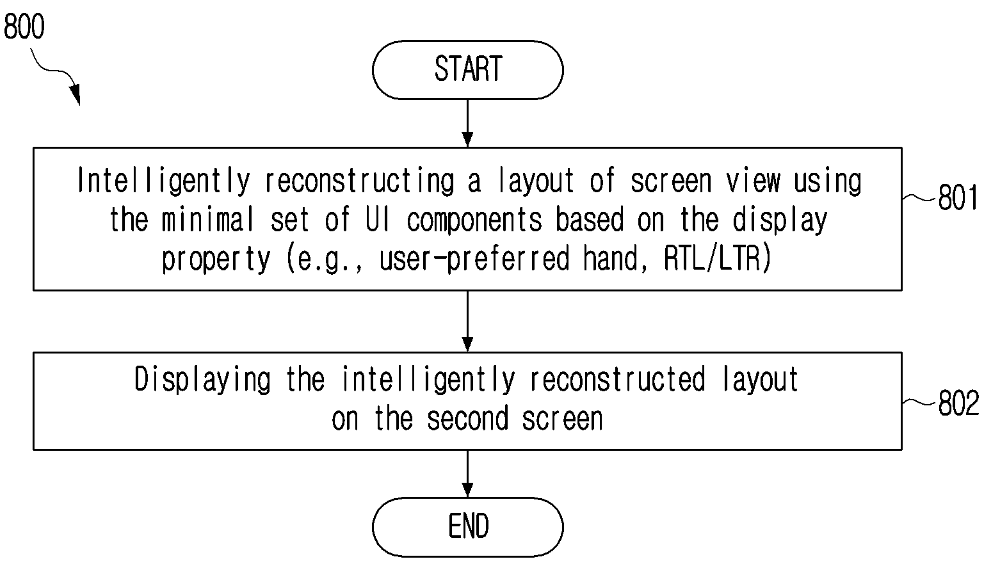
FIG. 8 is a flow diagram illustrating a method for intelligently modifying the screen view of the electronic device for managing the privacy of the screen view according to an embodiment of the disclosure.

FIG. 8 is a flow diagram (800) illustrating a method for intelligently modifying a screen view of an electronic device for managing a privacy of a screen view according to an embodiment of the disclosure.

Referring to FIG. 8, operations 801-802 performs by the electronic device (100).

At operation 801, the method includes intelligently reconstructing a layout of the screen view using the minimal set of UI components based on the display property (e.g., user-preferred hand, right to left (RTL), LTR, or the like). At operation 802, the method includes displaying the intelligently reconstructed layout on the second screen (140*b*).

The various actions, acts, blocks, operations, or the like in the flow diagram(s) (300, 400, 500, 600, 700, and 800) may be performed in the order presented, in a different order, or simultaneously. Further, in some embodiments of the disclosure, some of the actions, acts, blocks, operations, or the like may be omitted, added, modified, skipped, or the like without departing from the scope of the disclosure.

Figure 9:
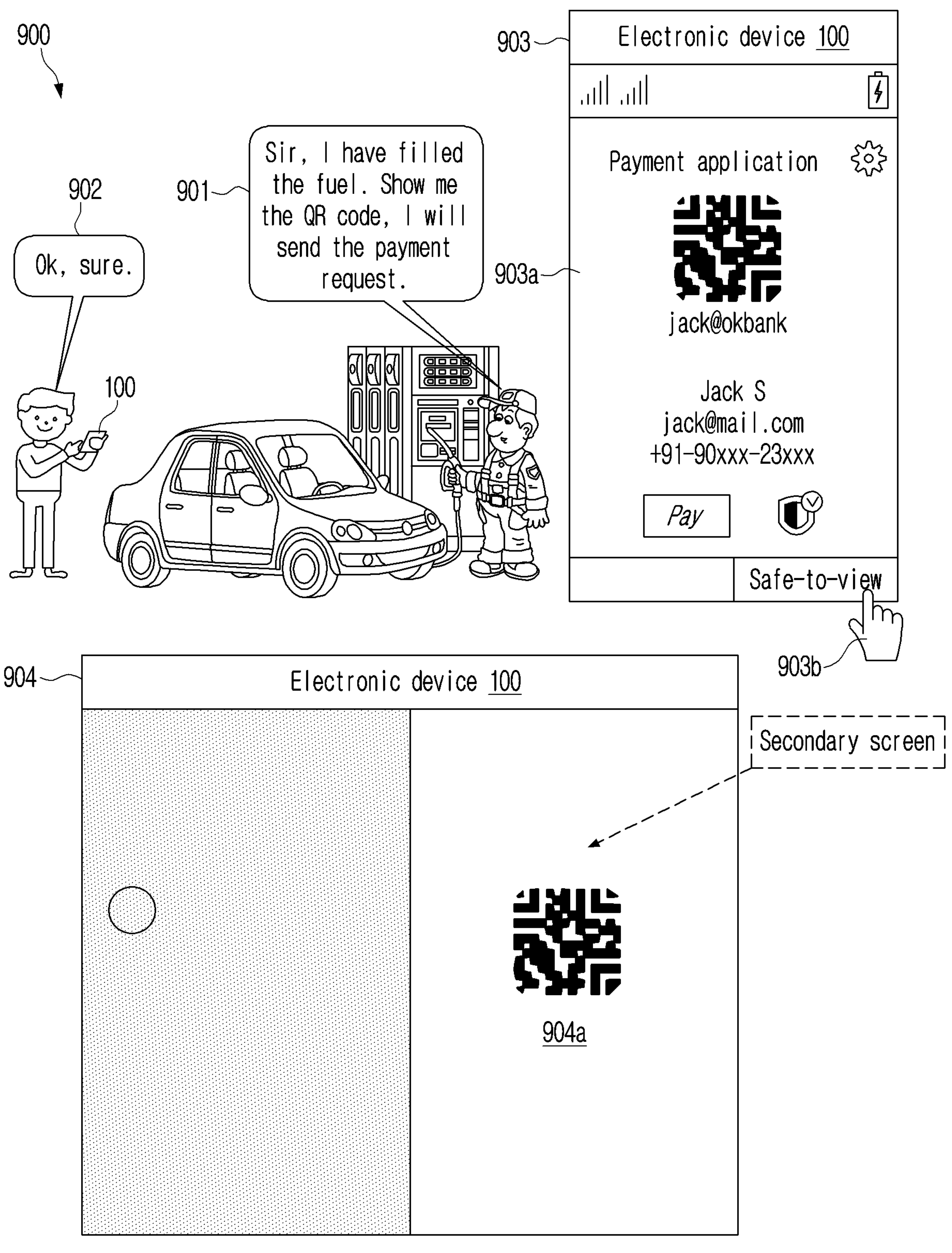
FIG. 9 illustrates a method for managing a privacy of a screen view while executing a payment event according to an embodiment of the disclosure.

FIG. 9 illustrates a method for managing a privacy of a screen view while executing a payment event according to an embodiment of the disclosure.

Referring to FIG. 9, consider scenario (900), in which the user of the electronic device (100) goes to a petrol station to fill up. After refueling, a petrol pump employee requests a QR code (901) in order to send a payment request to the user. To make a payment (902, 903), the user opens a payment app on his or her electronic device (100).

The privacy controller (160) identifies a given input/opened the payment application on a primary screen (903*a*) (i.e., a first screen (140*a*)) and the privacy controller (160) identifies the event intent "To make a Payment" and also determines whether it qualifies for "safe-to-view" rendering. The privacy controller (160) displays the notification message on the screen view of the electronic device (100) to share the displayed content in response to determining that the safe-to-view is compatible for the upcoming event (i.e., a payment request). The privacy controller (160) receives the user intent/input (e.g., a touch input (903*b*)) to share the displayed content when the notification message is displayed on the screen view of the electronic device (100).

The privacy controller (160) then determines one or more privacy parameters (e.g., RoI, sensitivity index, event relevancy score, or the like) of the displayed content and extracts all the UI component(s) through the segmentation method, for example, as shown in Table 1.

TABLE 1

| UI Component | Sensitivity index | Event relevancy |
|---|---|---|
| QR code | No | High |
| UPI Id | Yes | High |
| Name | Yes | Medium |
| Email address | Yes | Medium |
| Mobile number | Yes | High |
| Image 1 | No | Low |
| Image 2 | No | Low |

The privacy controller (160) determines that QR code, UPI Id, and Mobile number are essential UI component(s) to execute the upcoming event, but only QR code is safe and capable enough to execute the payment event. The privacy controller (160) intelligently modifies the screen view (904) of the electronic device (100), reddeners the QR code and displays the QR code on a secondary screen (904*a*) (i.e., a second screen (140*b*)).

Figure 10:
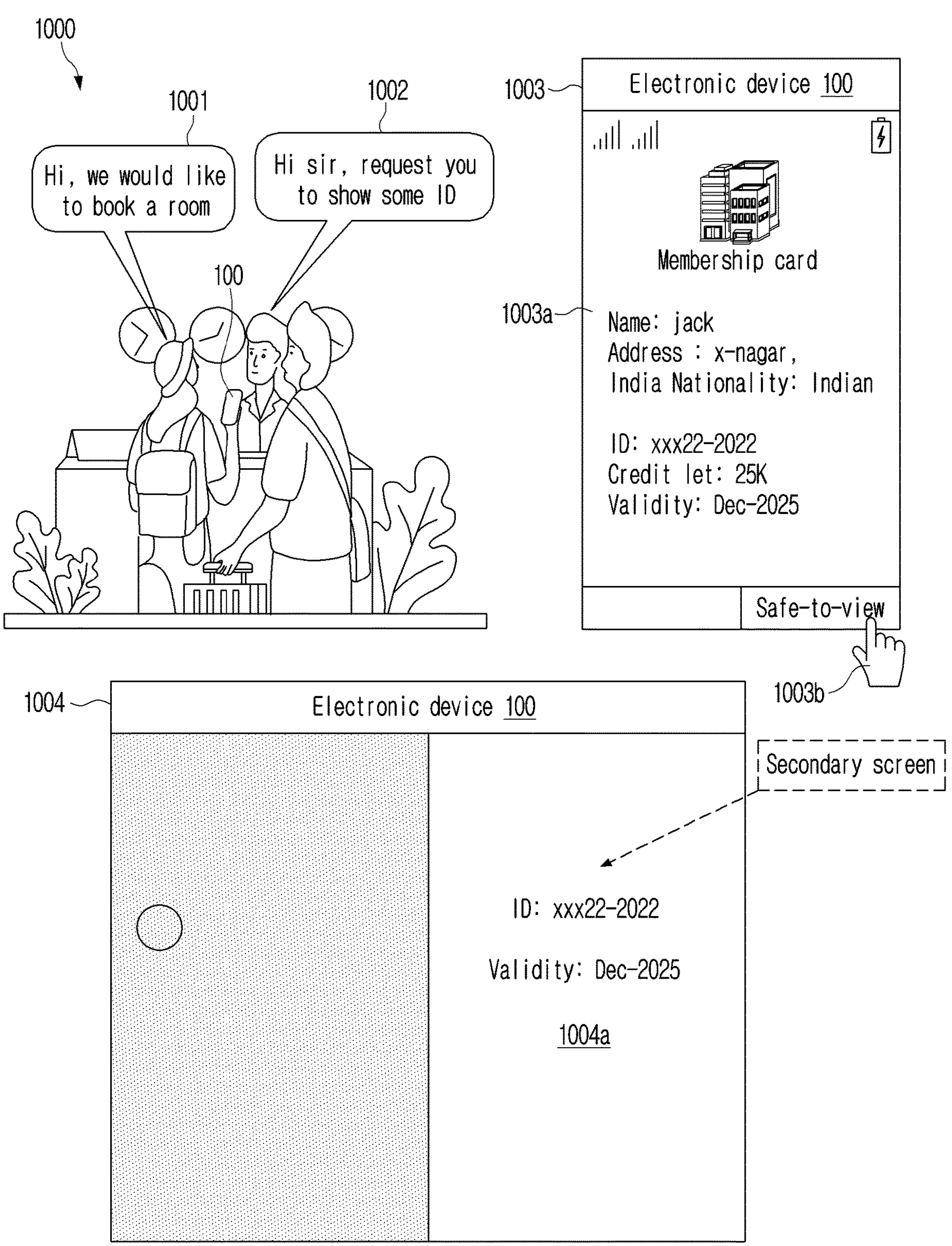
FIG. 10 illustrates a method for managing a privacy of a screen view while executing a hotel booking event according to an embodiment of the disclosure.

FIG. 10 illustrates a method for managing a privacy of a screen view while executing a hotel booking event according to an embodiment of the disclosure.

Referring to FIG. 10, consider a scenario (1000), in which the user of the electronic device (100) visits a hotel to book a room (1001). A hotel employee requests that the user show some ID (1002) during the verification/registration/booking process. The user launches a gallery application (1003) on his or her electronic device (100) to complete the verification/registration/booking process.

The privacy controller (160) identifies a given input/opened the gallery application on a primary screen (1003*a*) (i.e., a first screen (140*a*)) and the privacy controller (160) identifies the event intent "To show the ID" and also determines whether it qualifies for "safe-to-view" rendering. The privacy controller (160) displays the notification message on the screen view of the electronic device (100) to share the displayed content in response to determining that the safe-to-view is compatible for the upcoming event (i.e., to show the ID). The privacy controller (160) receives the user intent/input (e.g., touch input (1003*b*)) to share the displayed content when the notification message is displayed on the screen view of the electronic device (100).

The privacy controller (160) then determines one or more privacy parameters (e.g., RoI, sensitivity index, event relevancy score, or the like) of the displayed content and extracts all the UI component(s) through the segmentation method, for example, as shown in Table 2.

TABLE 2

| UI Component | Sensitivity index | Event relevancy |
|---|---|---|
| Image | No | Low |
| Text | No | Low |
| Name | Yes | High |
| Address | Yes | Medium |
| Nationality | No | Low |
| Membership ID | No | High |
| Credits left | Yes | Medium |
| Validity | No | High |

The privacy controller (160) determines that name, membership ID, and validity are essential UI component(s) to execute the upcoming event, but only membership ID, and validity are safe and capable enough to execute the hotel booking event. The privacy controller (160) intelligently modifies the screen view (904) of the electronic device (100), reddeners the membership ID, and validity, and displays the membership ID, and validity on a secondary screen (1004*a*) (i.e., a second screen (140*b*)).

Figure 11:
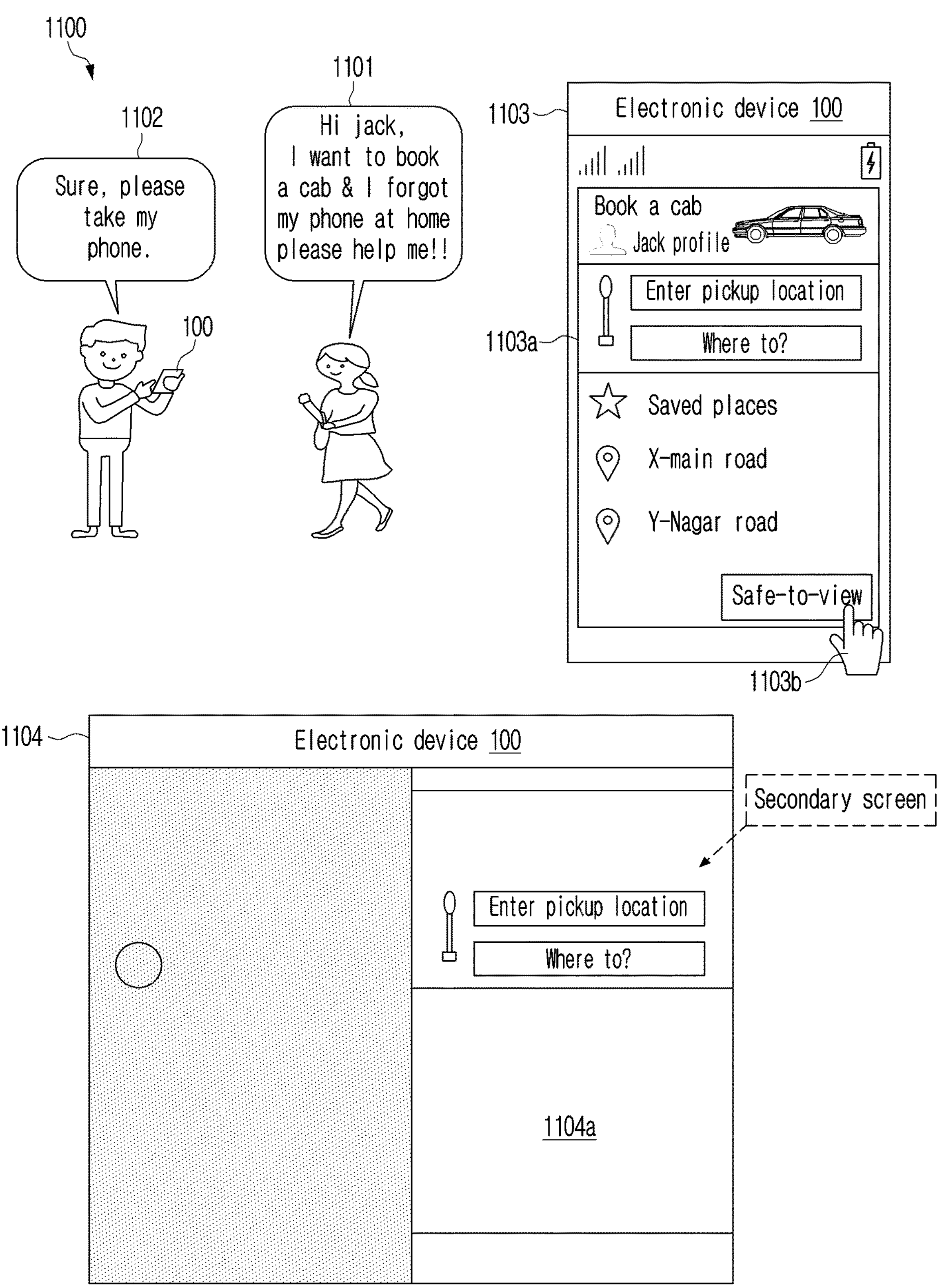
FIG. 11 illustrates a method for managing a privacy of a screen view while executing a cab booking event according to an embodiment of the disclosure.

FIG. 11 illustrates a method for managing a privacy of a screen view while executing a cab booking event according to an embodiment of the disclosure.

Referring to FIG. 11, consider a scenario (1100), in which the user of the electronic device (100) wants to book a cab (1101 and 1102) for a friend (second user). The user launches a cab application (1103) on his or her electronic device (100) to book the cab.

The privacy controller (160) identifies a given input/opened the cab application on a primary screen (1103*a*) (i.e., a first screen (140*a*)) and the privacy controller (160) identifies the event intent "To book the cab" and also determines whether it qualifies for "safe-to-view" rendering. The privacy controller (160) displays the notification message on the screen view of the electronic device (100) to share the displayed content in response to determining that the safe-to-view is compatible for the upcoming event (i.e., a book the cab). The privacy controller (160) receives the user intent/input (e.g., touch input (1103*b*)) to share the displayed content when the notification message is displayed on the screen view of the electronic device (100).

The privacy controller (160) then determines one or more privacy parameters (e.g., RoI, sensitivity index, event relevancy score, or the like) of the displayed content and extracts all the UI component(s) through the segmentation method, for example, as shown in Table 3.

TABLE 3

| UI Component | Sensitivity index | Event relevancy |
|---|---|---|
| Image | No | Low |
| Profile | Yes | Low |
| Pick up location | No | High |
| Where to | No | High |
| Saved places | Yes | Low |

The privacy controller (160) determines that the image, pickup location, and where to the location are essential UI component(s) to execute the upcoming event, but only pickup location and where to location are safe. The privacy controller (160) intelligently modifies the screen view (904) of the electronic device (100), reddeners pick up location, and where to location and displays the pickup location, and where to location on a secondary screen (1104*a*) (i.e., a second screen (140*b*)).

Figure 12:
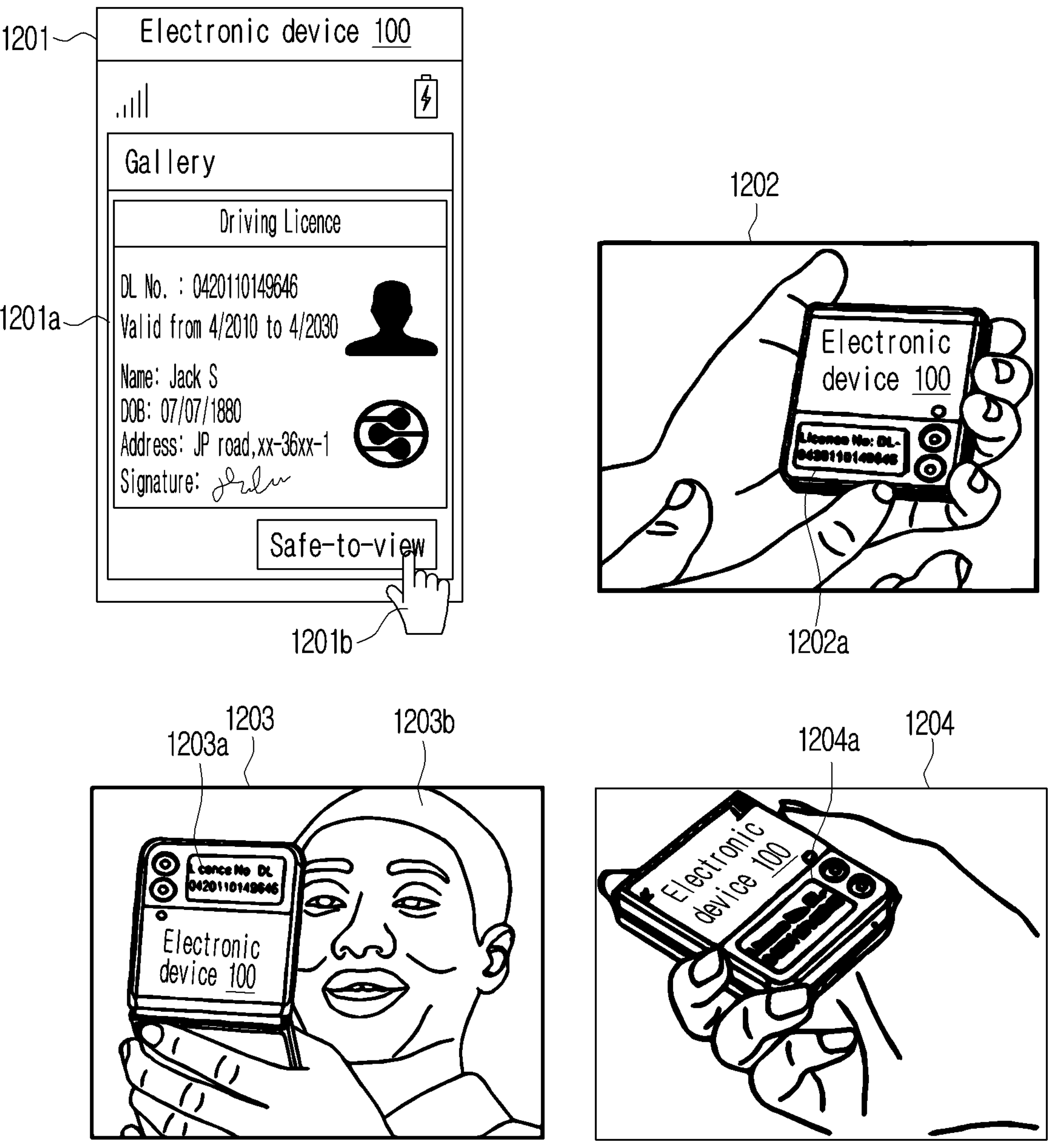
FIG. 12 illustrates a method for managing a privacy of a screen view for multi-display electronic device according to an embodiment of the disclosure.

FIG. 12 illustrates a method for managing a privacy of a screen view for multi-display electronic device according to an embodiment of the disclosure.

Referring to FIG. 12, consider an example scenario (1201) where the user (1203*b*) has been asked to share his license information in order to verify his license expiry. The privacy controller (160) identifies a given input/opened a gallery application on a primary screen (1201*a*) (i.e., a first screen (140*a*)) and the privacy controller (160) identifies the event intent "To share license" and also determines whether it qualifies for "safe-to-view" rendering. The privacy controller (160) displays the notification message on the screen view of the electronic device (100) to share the displayed content in response to determining that the safe-to-view is compatible for the upcoming event (i.e., to share his license). The privacy controller (160) receives the user intent/input (e.g., a touch input (1201*b*)) to share the displayed content when the notification message is displayed on the screen view of the electronic device (100).

The privacy controller (160) then determines one or more privacy parameters (e.g., RoI, sensitivity index, event relevancy score, or the like) of the displayed content and extracts all the UI component(s) through the segmentation method. The privacy controller (160) discovered that the License No. suffices for this verification (as calculated by sensitivity index and event relevance score). The privacy controller (160) then intelligently modifies the screen view based on (1202, 1203, and 1204) the orientation, preferred hand, folding style, or simply how the user holds the electronic device (100) in daily life. The modified screen view of the electronic device (100) is displayed on the second screen (140*b*) (i.e., 1202*a*, 1203*a*, and 1204*a*) of the electronic device (100).

In one embodiment of the disclosure, the proposed method is also extended to connected display devices, such as smart watches, dashboards, augmented reality (AR) devices, and virtual reality (VR) devices. For example, a first user and a second user are traveling in a car. The second user wants to listen to his/her playlist, so the second user asked the first user to share his/her electronic device (100) so that he/she could listen to his/her favorite songs. When the first user instructs a voice assistant (e.g., Bixby)/connected electronic device to play a song in an application on a connected dashboard (i.e., connected electronic device) display in the "safe view/screen," the connected electronic device hides all personalization related to the first user and plays a song/video-song on the connected electronic device. The second user can now play the song of his/her choice, and the first user is relieved because he/she is not sharing any personal information.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing privacy of a screen view on an electronic device comprising a first display and a second display, the method comprises:
- displaying, by the electronic device, a content on the first display of the electronic device, wherein the content comprises a plurality of UI components;
- determining, by the electronic device, at least one upcoming event of a user of the electronic device based on a plurality of event parameters of the displayed content, the plurality of event parameters comprising screen context information, time-stamp information, location information, and information associated with currently running application of the electronic device;
- determining, by the electronic device, one or more privacy parameters of the displayed content in relation to the at least one upcoming event; and
- displaying, by the electronic device, one or more sharing UI component of the plurality of UI components included in the content on the second display based on one or more privacy parameters,
- wherein the one or more privacy parameters comprises a region of interest (RoI), and
- wherein the RoI is determined by scraping the displayed content to extract the RoI and serializes the extracted RoI based on application content localization.

2. The method of claim 1, wherein the determining, by the electronic device, of the at least one upcoming event of the electronic device comprises:
- determining, by the electronic device, the plurality of event parameters of the displayed content;
- applying, by the electronic device, the plurality of event parameters to a pre-trained on-device machine learning (ML) model to determine the at least one upcoming event in a real-time;
- determining, by the electronic device, the at least one upcoming event of the electronic device;
- determining, by the electronic device, whether a safe-to-view is compatible for the at least one upcoming event based on the displayed content on the first display of the electronic device, wherein the safe-to-view excludes one or more private objects which is not essential to execute the at least one upcoming event;
- displaying, by the electronic device, a notification message on the first display of the electronic device to share the displayed content in response to determining that the safe-to-view is compatible for the at least one upcoming event; and
- receiving, by the electronic device, an intent of the user to share the displayed content when the notification message is displayed on the first display of the electronic device.

3. The method of claim 2, wherein the at least one upcoming event comprises a payment event, a booking event, a check-in event, a dynamic web-content sharing event, and a screen sharing event.

4. The method of claim 2, wherein the intent of the user to share the displayed content is determined based on at least one of a text command received from a user of the electronic device, a voice input received from the user of the electronic device, a touch input received from the user of the electronic device, a gesture input received from the user of the electronic device, changing an orientation of the electronic device, selecting a region on a screen of the electronic device or pressing a hardware key of the electronic device.

5. The method of claim 1, wherein the RoI is determined by:
- extracting, by the electronic device, at least one region of interest (RoI) of the first display of the electronic device through a segmentation method, wherein the at least one RoI comprises at least one user interface (UI) component.

6. The method of claim 5, wherein a sensitivity index is determined by:
- determining, by the electronic device, the sensitivity index of each UI component using a pre-trained on-device deep learning classifier, where in the pre- trained on-device deep learning classifier trained using a diverse dataset, and the diverse dataset comprises an intent of the user, a preference of the user, a previous interaction of the user, and screen context information.

7. The method of claim 6, wherein event relevancy is determined by:
- determining, by the electronic device, an event relevancy score of each UI component using the pre-trained on-device deep learning classifier, wherein the pre-trained on-device deep learning classifier trained using a diverse dataset, and the diverse dataset comprises an intent of the at least one upcoming event, a preference of the user relates to the at least one upcoming event, a previous interaction of the user with the at least one upcoming event, and the screen context information.

8. The method of claim 1, wherein the displaying, by the electronic device, of one or more sharing UI component comprises displaying, by the electronic device, one or more sharing UI component on the second display based on a folding style of the electronic device.

9. An electronic device for managing privacy of a screen view, the electronic device comprising:
- a first display and a second display;
- at least one processor; and
- a memory storing one or more programs configured to be executed by the at least one processor, the one or more programs including instructions for:

displaying, on the first display, a content comprising a plurality of UI components, determining at least one upcoming event of a user of the electronic device based on a plurality of event parameters of the displayed content, the plurality of event parameters comprising screen context information, time-stamp information, location information, and information associated with currently running application of the electronic device, determining one or more privacy parameters of the displayed content in relation to the at least one upcoming event, and displaying, by the electronic device, one or more sharing UI component of the plurality of UI components included in the content on the second display based on one or more privacy parameters, wherein the one or more privacy parameters comprises a region of interest (RoI), and wherein the RoI is determined by scraping the displayed content to extract the RoI and serializes the extracted RoI based on application content localization.

10. The electronic device of claim 9, wherein the one or more programs including instructions for:

determining the plurality of event parameters of the displayed content;

applying the plurality of event parameters to a pre-trained on-device machine learning (ML) model to determine the at least one upcoming event in a real-time;

determining the at least one upcoming event of the electronic device;

determining whether a safe-to-view is compatible for the at least one upcoming event based on the displayed content on the first display of the electronic device, wherein the safe-to-view excludes one or more private objects which is not essential to execute the at least one upcoming event;

displaying, on the display, a notification message on the first display of the electronic device to share the displayed content in response to determining that the safe-to-view is compatible for the at least one upcoming event; and receiving an intent of the user to share the displayed content when the notification message is displayed on the first display of the electronic device.

11. The electronic device of claim 10, wherein the at least one upcoming event comprises a payment event, a booking event, a check-in event, a dynamic web-content sharing event, and a screen sharing event.

12. The electronic device of claim 10, wherein the intent of the user to share the displayed content is determined based on at least one of a text command received from a user of the electronic device, a voice input received from the user of the electronic device, a touch input received from the user of the electronic device, a gesture input received from the user of the electronic device, changing an orientation of the electronic device, selecting a region on a screen of the electronic device or pressing a hardware key of the electronic device.

* * * * *